United States Patent
Schellekens et al.

(10) Patent No.: US 10,597,097 B2
(45) Date of Patent: Mar. 24, 2020

(54) AERODYNAMIC FEATURES OF PLASTIC GLAZING OF TAILGATES

(71) Applicant: SABIC Global Technologies B.V., Bergen op Zoom (NL)

(72) Inventors: Geert Jan Schellekens, Glize (NL); Matteo Terragni, Misinto (IT)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/756,662

(22) PCT Filed: Sep. 7, 2016

(86) PCT No.: PCT/IB2016/055332
§ 371 (c)(1),
(2) Date: Mar. 1, 2018

(87) PCT Pub. No.: WO2017/042697
PCT Pub. Date: Mar. 16, 2017

(65) Prior Publication Data
US 2018/0312204 A1 Nov. 1, 2018

Related U.S. Application Data

(60) Provisional application No. 62/215,086, filed on Sep. 7, 2015.

(51) Int. Cl.
*B60J 9/00* (2006.01)
*B62D 35/00* (2006.01)
(Continued)

(52) U.S. Cl.
CPC .............. *B62D 35/007* (2013.01); *B29C 45/16* (2013.01); *B60H 1/249* (2013.01); *B60J 1/18* (2013.01);
(Continued)

(58) Field of Classification Search
CPC .............. B32B 17/10; B32B 17/10761; B32B 17/10036; B32B 2367/00; B32B 17/10174; B29C 66/71; B60J 5/107
See application file for complete search history.

(56) References Cited

U.S. PATENT DOCUMENTS

| 4,551,484 A | 11/1985 | Radisch et al. |
| 4,558,634 A | 12/1985 | Oshiro et al. |

(Continued)

FOREIGN PATENT DOCUMENTS

| CA | 2762401 A | 6/2012 |
| CN | 101130292 A | 2/2008 |

(Continued)

OTHER PUBLICATIONS

U.S. Appl. No. 61/935,718, filed Feb. 4, 2014.
(Continued)

*Primary Examiner* — Kiran B Patel
(74) *Attorney, Agent, or Firm* — BakerHostetler (57) ABSTRACT

A plastic glazing of a tailgate of a vehicle is provided, the plastic glazing comprising: a first translucent component comprising a full panel of the plastic glazing; a second translucent component molded onto the first translucent component, wherein the second translucent component is a colored thermoplastic polymer, wherein the plastic glazing is of one-piece molded plastic construction, wherein at least one of the first translucent component and the second translucent component comprises one or more aerodynamic features, wherein the one or more aerodynamic features are each configured to reduce one or more of: a turbulence, a drag force, and a lift force.

15 Claims, 8 Drawing Sheets

(51) Int. Cl.
  *B29C 45/16* (2006.01)
  *B60J 5/10* (2006.01)
  *B60J 1/18* (2006.01)
  *B60Q 1/26* (2006.01)
  *B60H 1/24* (2006.01)
  *B60Q 1/30* (2006.01)
  *B60Q 1/44* (2006.01)
  *B62D 29/04* (2006.01)
  *B62D 37/02* (2006.01)
  *B29L 31/30* (2006.01)
  *B29L 31/00* (2006.01)

(52) U.S. Cl.
  CPC ............. *B60J 5/107* (2013.01); *B60Q 1/268* (2013.01); *B60Q 1/302* (2013.01); *B60Q 1/44* (2013.01); *B62D 29/04* (2013.01); *B62D 37/02* (2013.01); *B29K 2995/002* (2013.01); *B29K 2995/0021* (2013.01); *B29K 2995/0025* (2013.01); *B29K 2995/0026* (2013.01); *B29K 2995/0029* (2013.01); *B29L 2031/3005* (2013.01); *B29L 2031/747* (2013.01)

(56) References Cited

U.S. PATENT DOCUMENTS

| | | |
|---|---|---|
| 4,609,688 A | 9/1986 | Radisch et al. |
| 4,636,698 A | 1/1987 | Leclercq |
| 4,645,970 A | 2/1987 | Murphy |
| 4,712,287 A | 12/1987 | Johnston |
| 4,765,672 A | 8/1988 | Weaver |
| 4,775,402 A | 10/1988 | Letemps et al. |
| 4,778,366 A | 10/1988 | Weaver |
| 4,792,425 A | 12/1988 | Weaver |
| 4,871,385 A | 10/1989 | Lecourt et al. |
| 4,888,072 A | 12/1989 | Ohlenforst et al. |
| 5,060,440 A | 10/1991 | Weaver |
| 5,071,709 A | 12/1991 | Berquier et al. |
| 5,324,374 A | 6/1994 | Harmand et al. |
| 5,443,862 A | 8/1995 | Buffat et al. |
| 5,451,090 A | 9/1995 | Brodie et al. |
| 5,495,400 A | 2/1996 | Currie |
| 5,505,023 A | 4/1996 | Gillen et al. |
| 5,508,585 A | 4/1996 | Butt |
| 5,637,363 A | 6/1997 | Leray et al. |
| 5,669,693 A | 9/1997 | Smith |
| 5,726,953 A | 3/1998 | Lapointe et al. |
| 5,757,127 A | 5/1998 | Inoguchi et al. |
| 5,772,304 A | 6/1998 | Smith |
| 5,776,603 A | 7/1998 | Zagdoun et al. |
| 5,780,965 A | 7/1998 | Cass et al. |
| 5,807,515 A | 9/1998 | Fisher et al. |
| 5,857,770 A | 1/1999 | Fohl et al. |
| 5,887,393 A | 3/1999 | Vanark et al. |
| 5,890,796 A | 4/1999 | Marinelli et al. |
| 5,965,981 A | 10/1999 | Inoguchi et al. |
| 6,054,189 A | 4/2000 | Bravet et al. |
| 6,106,931 A | 8/2000 | Ito et al. |
| 6,224,135 B1 * | 5/2001 | Rehkopf .............. B60J 1/20 296/91 |
| 6,241,302 B1 * | 6/2001 | Rehkopf ............. B60J 1/2008 296/91 |
| 6,432,332 B1 | 8/2002 | Matsco et al. |
| 6,461,028 B1 | 10/2002 | Huang |
| 6,468,677 B1 | 10/2002 | Benton et al. |
| 6,536,930 B1 | 3/2003 | Hirmer |
| 6,585,402 B2 | 7/2003 | Ohkodo et al. |
| 6,627,319 B2 | 9/2003 | Jacquiod et al. |
| 6,660,968 B1 | 12/2003 | Mottelet et al. |
| 6,747,779 B1 | 6/2004 | Morin et al. |
| 6,811,857 B1 | 11/2004 | Bravet et al. |
| 6,811,895 B2 | 11/2004 | Murasko et al. |
| 6,852,393 B2 | 2/2005 | Gandon |
| 6,872,453 B2 | 3/2005 | Arnaud et al. |
| 6,908,204 B2 | 6/2005 | Kraft |
| 6,965,196 B2 | 11/2005 | Murasko et al. |
| 7,012,728 B2 | 3/2006 | Morin et al. |
| 7,018,057 B2 | 3/2006 | Richard |
| 7,024,822 B2 | 4/2006 | Scheer et al. |
| 7,025,482 B2 | 4/2006 | Yamashita et al. |
| 7,026,577 B2 | 4/2006 | Maeuser et al. |
| 7,048,400 B2 | 5/2006 | Murasko et al. |
| 7,048,422 B1 | 5/2006 | Solomon |
| 7,048,423 B2 | 5/2006 | Stepanenko et al. |
| 7,100,328 B2 | 9/2006 | Scheer et al. |
| 7,144,289 B2 | 12/2006 | Murasko et al. |
| 7,172,322 B2 | 2/2007 | Pommeret et al. |
| 7,265,889 B2 | 9/2007 | Morin et al. |
| 7,270,863 B2 | 9/2007 | Harima et al. |
| 7,290,906 B2 | 11/2007 | Suzuki et al. |
| 7,311,976 B2 | 12/2007 | Arnaud et al. |
| 7,318,663 B2 | 1/2008 | Verbrugh et al. |
| 7,469,450 B2 | 12/2008 | Gipson |
| 7,500,774 B2 | 3/2009 | Nishiyama et al. |
| 7,553,536 B1 | 6/2009 | Naoumenko et al. |
| 7,584,689 B2 | 9/2009 | Jones et al. |
| 7,654,721 B2 | 2/2010 | Okada |
| 7,686,489 B2 | 3/2010 | Ajiki et al. |
| 7,712,933 B2 | 5/2010 | Fleischmann et al. |
| 7,745,018 B2 | 6/2010 | Murasko et al. |
| 7,793,580 B2 | 9/2010 | Jones et al. |
| 7,806,538 B2 | 10/2010 | Ajiki et al. |
| 7,815,345 B2 | 10/2010 | Misawa et al. |
| 7,857,495 B2 | 12/2010 | Misawa et al. |
| 7,883,249 B2 | 2/2011 | Totani et al. |
| 7,892,661 B2 | 2/2011 | Boire et al. |
| 7,922,374 B2 | 4/2011 | Schwab et al. |
| 7,929,194 B2 | 4/2011 | Legois et al. |
| 7,985,011 B2 | 7/2011 | Ajiki et al. |
| 8,007,152 B2 | 8/2011 | Nakabayashi |
| 8,025,004 B2 | 9/2011 | Jones et al. |
| 8,044,415 B2 | 10/2011 | Messere et al. |
| 8,057,615 B2 | 11/2011 | Grussaute-Nghiem et al. |
| 8,083,388 B2 | 12/2011 | Sun et al. |
| 8,179,034 B2 | 5/2012 | Potts et al. |
| 8,226,282 B2 | 7/2012 | Kazaoka et al. |
| 8,297,168 B2 | 10/2012 | Jones et al. |
| 8,298,032 B2 | 10/2012 | Potts et al. |
| 8,303,147 B2 | 11/2012 | Jeon |
| 8,314,546 B2 | 11/2012 | Tchakarov |
| 8,317,381 B2 | 11/2012 | Heidinger |
| 8,339,040 B2 | 12/2012 | Bruton et al. |
| 8,349,445 B2 | 1/2013 | Jacquiod et al. |
| 8,384,520 B2 | 2/2013 | Fourreau |
| 8,403,399 B2 | 3/2013 | Kuntze et al. |
| 8,408,773 B2 | 4/2013 | Judge |
| 8,471,177 B2 | 6/2013 | Chaussade et al. |
| 8,550,536 B2 | 10/2013 | Gachter et al. |
| 8,585,263 B2 | 11/2013 | Shipman |
| 8,622,458 B2 | 1/2014 | Hache |
| 8,641,257 B2 | 2/2014 | Richardson |
| 8,646,829 B2 | 2/2014 | Crane et al. |
| 8,690,220 B2 | 4/2014 | Tsukiyama et al. |
| 8,697,186 B2 | 4/2014 | Zagdoun et al. |
| 8,727,422 B2 | 5/2014 | Iwabuchi et al. |
| 8,808,790 B2 | 8/2014 | Zagdoun et al. |
| 8,829,539 B2 | 9/2014 | Kleo et al. |
| 9,006,751 B2 | 4/2015 | Kleo et al. |
| 9,090,120 B2 | 7/2015 | Pires et al. |
| 9,210,771 B2 | 12/2015 | Day |
| 9,637,184 B1 * | 5/2017 | Bennett ............... B62D 35/001 |
| 9,821,862 B2 * | 11/2017 | Han ..................... B62D 35/00 |
| 9,902,437 B2 * | 2/2018 | Demange ............ B62D 29/04 |
| 2002/0037421 A1 | 3/2002 | Arnaud et al. |
| 2004/0005472 A1 | 1/2004 | Arnaud et al. |
| 2004/0191618 A1 | 9/2004 | Morin et al. |
| 2004/0265512 A1 | 12/2004 | Aengenheyster et al. |
| 2005/0045613 A1 | 3/2005 | Maeuser et al. |
| 2005/0147825 A1 | 7/2005 | Arnaud et al. |
| 2005/0168013 A1 * | 8/2005 | Rinklin ............... B62D 35/007 296/180.1 |
| 2005/0242721 A1 | 11/2005 | Foust et al. |
| 2006/0005484 A1 | 1/2006 | Riblier et al. |

(56) References Cited

U.S. PATENT DOCUMENTS

| | | |
|---|---|---|
| 2006/0033978 A1 | 2/2006 | Morin et al. |
| 2006/0210772 A1 | 9/2006 | Bui et al. |
| 2006/0210778 A1 | 9/2006 | Benyahia et al. |
| 2007/0026235 A1 | 2/2007 | Chen et al. |
| 2007/0068375 A1 | 3/2007 | Jones et al. |
| 2007/0068376 A1 | 3/2007 | Jones et al. |
| 2007/0157671 A1 | 7/2007 | Thellier et al. |
| 2008/0241523 A1 | 10/2008 | Huignard et al. |
| 2008/0254299 A1 | 10/2008 | Blackburn et al. |
| 2008/0264930 A1 | 10/2008 | Mennechez et al. |
| 2009/0110918 A1 | 4/2009 | Jacquiod et al. |
| 2009/0308239 A1 | 12/2009 | Jones et al. |
| 2010/0026045 A1* | 2/2010 | Thomas ............... B62D 35/007 296/180.1 |
| 2010/0061093 A1 | 3/2010 | Janssen et al. |
| 2010/0288117 A1 | 11/2010 | Jones et al. |
| 2011/0033667 A1 | 2/2011 | Leconte et al. |
| 2011/0061302 A1 | 3/2011 | Barral et al. |
| 2011/0240343 A1 | 10/2011 | Zagdoun et al. |
| 2011/0241376 A1 | 10/2011 | Igura |
| 2011/0248219 A1 | 10/2011 | Zagdoun et al. |
| 2011/0250387 A1 | 10/2011 | Zagdoun et al. |
| 2012/0001027 A1 | 1/2012 | Jones et al. |
| 2012/0153670 A1 | 6/2012 | Crane et al. |
| 2012/0229907 A1 | 9/2012 | Ueda |
| 2012/0248814 A1 | 10/2012 | Tsukiyama et al. |
| 2012/0280533 A1 | 11/2012 | Gachter et al. |
| 2012/0320621 A1 | 12/2012 | Kleo et al. |
| 2013/0033894 A1 | 2/2013 | Kleo et al. |
| 2013/0051049 A1 | 2/2013 | Sato |
| 2013/0135885 A1 | 5/2013 | Anzai |
| 2013/0182451 A1 | 7/2013 | Oba et al. |
| 2013/0201709 A1 | 8/2013 | Natsume |
| 2013/0280452 A1 | 10/2013 | Nawroth et al. |
| 2013/0293105 A1 | 11/2013 | Day |
| 2013/0313601 A1 | 11/2013 | Aeling et al. |
| 2013/0314935 A1 | 11/2013 | Tokieda et al. |
| 2014/0003076 A1 | 1/2014 | Suganumata et al. |
| 2014/0077525 A1* | 3/2014 | Yoshimura ........... B62D 35/007 296/180.1 |
| 2014/0110964 A1 | 4/2014 | Schijve et al. |
| 2015/0084370 A1* | 3/2015 | Newberry ............ B62D 35/007 296/180.1 |
| 2015/0274223 A1* | 10/2015 | Wolf .................... B62D 35/007 296/180.5 |
| 2017/0301981 A1* | 10/2017 | Niihara ................ H01Q 1/3275 |
| 2018/0050741 A1* | 2/2018 | Wolf ....................... B60K 11/06 |
| 2018/0186220 A1* | 7/2018 | Leterrier ............. B60R 13/0243 |
| 2018/0236699 A1* | 8/2018 | Schellekens ......... B62D 29/043 |
| 2018/0244136 A1 | 8/2018 | Schellekens et al. |
| 2018/0251166 A1* | 9/2018 | Escoffier ............... B62D 35/007 |
| 2018/0252382 A1* | 9/2018 | Schellekens ...... B29C 45/14811 |

FOREIGN PATENT DOCUMENTS

| | | |
|---|---|---|
| CN | 201566450 U | 9/2010 |
| CN | 102458890 B | 5/2014 |
| CN | 103772921 A | 5/2014 |
| CN | 203655050 U | 6/2014 |
| CN | 203713981 U | 7/2014 |
| CN | 203844852 U | 9/2014 |
| DE | 19706043 A1 | 6/1998 |
| DE | 69617705 T2 | 8/2002 |
| DE | 10147537 A1 | 4/2003 |
| DE | 69530806 T2 | 4/2004 |
| DE | 69929597 T2 | 9/2006 |
| DE | 60025815 T2 | 11/2006 |
| DE | 60027335 T2 | 1/2007 |
| DE | 60219518 T2 | 1/2008 |
| DE | 102008004942 | 6/2009 |
| DE | 102009058788 A1 | 6/2011 |
| DE | 202011110333 U1 | 8/2013 |
| EP | 0266514 A2 | 5/1988 |
| EP | 0267331 A1 | 5/1988 |
| EP | 0235447 B1 | 2/1994 |
| EP | 0453092 B1 | 8/1994 |
| EP | 0671864 A2 | 9/1995 |
| EP | 1000809 A1 | 5/2000 |
| EP | 1494062 A2 | 1/2005 |
| EP | 1787841 A2 | 5/2007 |
| EP | 1892182 A1 | 2/2008 |
| EP | 1950492 A1 | 7/2008 |
| EP | 1992478 A1 | 11/2008 |
| EP | 2005226 A1 | 12/2008 |
| EP | 1261557 B1 | 11/2009 |
| EP | 2219862 A1 | 8/2010 |
| EP | 2275770 A1 | 1/2011 |
| EP | 2275771 A1 | 1/2011 |
| EP | 2275772 A1 | 1/2011 |
| EP | 2287557 A1 | 2/2011 |
| EP | 1824696 B1 | 1/2012 |
| EP | 2574142 A1 | 3/2013 |
| EP | 1897412 B1 | 12/2013 |
| FR | 2792628 A1 | 10/2000 |
| FR | 2863210 A1 | 6/2005 |
| FR | 2884148 B1 | 9/2007 |
| FR | 2961151 B1 | 6/2012 |
| FR | 2968631 A1 | 6/2012 |
| FR | 2996803 A1 | 4/2014 |
| GB | 1329505 A | 9/1973 |
| GB | 1480193 A | 7/1977 |
| GB | 2442364 A | 4/2008 |
| GB | 2513620 A | 11/2014 |
| JP | H08-050933 A | 2/1996 |
| JP | H08-207204 A | 8/1996 |
| JP | 2584764 B2 | 2/1997 |
| JP | H10-036706 A | 2/1998 |
| JP | H10-180183 A | 7/1998 |
| JP | 10-329165 A | 12/1998 |
| JP | 2000-233951 A | 8/2000 |
| JP | 2000-301985 A | 10/2000 |
| JP | 2002-518207 A | 6/2002 |
| JP | 2002-533233 A | 10/2002 |
| JP | 2002-543027 A | 12/2002 |
| JP | 2003-513840 A | 4/2003 |
| JP | 3445860 B2 | 9/2003 |
| JP | 2003-529462 A | 10/2003 |
| JP | 2004-534667 A | 11/2004 |
| JP | 2005-511473 A | 4/2005 |
| JP | 3741461 B2 | 2/2006 |
| JP | 3961583 B2 | 8/2007 |
| JP | 2008-528329 A | 7/2008 |
| JP | 2008-543706 A | 12/2008 |
| JP | 2008-545465 A | 12/2008 |
| JP | 2009-500271 A | 1/2009 |
| JP | 2009-512977 A | 3/2009 |
| JP | 4242743 B2 | 3/2009 |
| JP | 4251678 B2 | 4/2009 |
| JP | 4440641 B2 | 3/2010 |
| JP | 2010-188792 A | 9/2010 |
| JP | 2010-247676 A | 11/2010 |
| JP | 2010-260519 A | 11/2010 |
| JP | 2011-051544 A | 3/2011 |
| JP | 2011-057188 A | 3/2011 |
| JP | 2011-514849 A | 5/2011 |
| JP | 2011-121479 A | 6/2011 |
| JP | 2011-126388 A | 6/2011 |
| JP | 4700804 B2 | 6/2011 |
| JP | 2011-136606 A | 7/2011 |
| JP | 4754044 B2 | 8/2011 |
| JP | 4771262 B2 | 9/2011 |
| JP | 2011-219000 A | 11/2011 |
| JP | 2012-030654 A | 2/2012 |
| JP | 2012-503716 A | 2/2012 |
| JP | 2012-503852 A | 2/2012 |
| JP | 2012-046109 A | 3/2012 |
| JP | 2012-061957 A | 3/2012 |
| JP | 2012-131375 A | 7/2012 |
| JP | 5015764 B2 | 8/2012 |
| JP | 2012-206612 A | 10/2012 |
| JP | 2012-206614 A | 10/2012 |
| JP | 5054376 B2 | 10/2012 |
| JP | 5107242 B2 | 12/2012 |

(56) References Cited

FOREIGN PATENT DOCUMENTS

| | | |
|---|---|---|
| JP | 2013-006570 A | 1/2013 |
| JP | 5128733 B2 | 1/2013 |
| JP | 2013-056669 A | 3/2013 |
| JP | 5160900 B2 | 3/2013 |
| JP | 2013-517989 A | 5/2013 |
| JP | 2013-517990 A | 5/2013 |
| JP | 2013-124006 A | 6/2013 |
| JP | 5235658 B2 | 7/2013 |
| JP | 5243447 B2 | 7/2013 |
| JP | 2013-230716 A | 11/2013 |
| JP | 2013-230717 A | 11/2013 |
| JP | 2013-230723 A | 11/2013 |
| JP | 5479732 B2 | 4/2014 |
| JP | 2014-076707 A | 5/2014 |
| JP | 2014-091342 A | 5/2014 |
| JP | 2014-101055 A | 6/2014 |
| JP | 2014-104790 A | 6/2014 |
| JP | 2014-159243 A | 9/2014 |
| KR | 2008-0034314 A | 4/2008 |
| WO | WO 1987/003846 A1 | 7/1987 |
| WO | WO 1994/022779 A2 | 10/1994 |
| WO | WO 1998/047703 A1 | 10/1998 |
| WO | WO 1999/003678 A1 | 1/1999 |
| WO | WO 1999/065678 A1 | 12/1999 |
| WO | WO 2000/037374 A1 | 6/2000 |
| WO | WO 2000/057243 A1 | 9/2000 |
| WO | WO 2000/067530 A1 | 11/2000 |
| WO | WO 2001/026924 A1 | 4/2001 |
| WO | WO 2002/002472 A1 | 1/2002 |
| WO | WO 2002/072330 A1 | 9/2002 |
| WO | WO 2003/010105 A1 | 2/2003 |
| WO | WO 2003/026869 A1 | 4/2003 |
| WO | WO 2006/030165 A1 | 3/2006 |
| WO | WO 2006/091959 A2 | 8/2006 |
| WO | WO 2006/095005 A1 | 9/2006 |
| WO | WO 2006/135832 A2 | 12/2006 |
| WO | WO 2007/003849 A2 | 1/2007 |
| WO | WO 2007/003849 A3 | 1/2007 |
| WO | WO 2007/119019 A1 | 10/2007 |
| WO | WO 2008/104728 A2 | 9/2008 |
| WO | WO 2008/132397 A2 | 11/2008 |
| WO | WO 2009/074266 A1 | 6/2009 |
| WO | WO 2010/034944 A1 | 4/2010 |
| WO | WO 2010/034945 A1 | 4/2010 |
| WO | WO 2010/034949 A1 | 4/2010 |
| WO | WO 2010/034950 A1 | 4/2010 |
| WO | WO 2010/049638 A1 | 5/2010 |
| WO | WO 2009/056775 A2 | 8/2010 |
| WO | WO 2011/092419 A1 | 4/2011 |
| WO | WO 2011/092420 A2 | 4/2011 |
| WO | WO 2011/092421 A1 | 4/2011 |
| WO | WO 2011/054826 A1 | 5/2011 |
| WO | WO 2011/067541 A1 | 6/2011 |
| WO | WO 2011/157911 A1 | 12/2011 |
| WO | WO 2012/055873 A2 | 5/2012 |
| WO | WO 2012/055873 A3 | 5/2012 |
| WO | WO 2012/080621 A1 | 6/2012 |
| WO | WO 2012/085433 A1 | 6/2012 |
| WO | WO 2012/098330 A1 | 7/2012 |
| WO | WO 2012/104530 A1 | 8/2012 |
| WO | WO 2012/126708 A1 | 9/2012 |
| WO | WO 2012/168009 A1 | 12/2012 |
| WO | WO 2012/168628 A1 | 12/2012 |
| WO | WO 2012/168646 A1 | 12/2012 |
| WO | WO 2013/017790 A1 | 2/2013 |
| WO | WO 2013/017791 A1 | 2/2013 |
| WO | WO 2013/017792 A1 | 2/2013 |
| WO | WO 2013/054059 A1 | 4/2013 |
| WO | WO 2013/068678 A1 | 5/2013 |
| WO | WO 2013/068679 A1 | 5/2013 |
| WO | WO 2013/079832 A1 | 6/2013 |
| WO | WO 2013/087518 A1 | 6/2013 |
| WO | WO 2013/093301 A1 | 6/2013 |
| WO | WO 2013/110885 A1 | 8/2013 |
| WO | WO 2013/121134 A1 | 8/2013 |
| WO | WO 2013/153303 A1 | 10/2013 |
| WO | WO 2013/167832 A1 | 11/2013 |
| WO | WO 2014/009630 A1 | 1/2014 |
| WO | WO 2014/020249 A1 | 2/2014 |
| WO | WO 2014/037643 A1 | 3/2014 |
| WO | WO 2014/037671 A1 | 3/2014 |
| WO | WO 2014/057200 A1 | 4/2014 |
| WO | WO 2014/060338 A1 | 4/2014 |
| WO | WO 2015/052655 A1 | 4/2015 |
| WO | WO 2015/079186 A1 | 6/2015 |

OTHER PUBLICATIONS

U.S. Appl. No. 61/887,687, filed Oct. 7, 2013.
International Patent Application No. PCT/EP2011/068667; Int'l Search Report; dated Jun. 1, 2012; 5 pages.
International Patent Application No. PCT/EP2011/068667; Int'l Preliminary Report on Patentability; dated Apr. 30, 2013; 12 pages.
International Patent Application No. PCT/DE2005/002068; Int'l Preliminary Report on Patentability; dated May 22, 2007; 5 pages.
Bauer D.R.; "Application of Failure Models for Predicting Weatherability in Automotive Coatings"; American Chemical Society; Chapter 24; 1999; p. 378-395.
Anand et al.; "Role of adhesives in the dimensional stability of polycarbonate structural panels"; Int'l Journal of Adhesion & Adhesives; vol. 27; 2007; p. 338-350.
International Patent Application No. PCT/2016/055338; Int'l Search Report and the Written Opinion; dated Nov. 25, 2016; 15 pages.
International Patent Application No. PCT/IB2016/055338; Int'l Preliminary Report on Patentability; dated Mar. 22, 2018; 10 pages.
International Patent Application No. PCT/IB2016/055334; Int'l Written Opinion and the Search Report; dated Nov. 22, 2016; 10 pages.
International Patent Application No. PCT/IB2016/055334; Int'l Preliminary Report on Patentability; dated Mar. 22, 2018; 7 pages.
International Patent Application No. PCT/IB2016/055333; Int'l Written Opinion and the Search Report; dated Jan. 2, 2017; 11 pages.
International Patent Application No. PCT/IB2016/055333; Int'l Preliminary Report on Patentability; dated Mar. 22, 2018; 7 pages.
International Patent Application No. PCT/IB2016/055332; Int'l Search Report and the Written Opinion; dated Jan. 2, 2017; 12 pages.
International Patent Application No. PCT/IB2016/055332; Int'l Preliminary Report on Patentability; dated Mar. 22, 2018; 8 pages.

* cited by examiner

AERODYNAMIC FEATURES OF PLASTIC GLAZING OF TAILGATES

RELATED APPLICATION

This application is the National Stage of International Application No. PCT/IB2016/055332 filed Sep. 7, 2016, which claims the benefit of U.S. Provisional Application No. 62/215,086 filed Sep. 7, 2015, the disclosures of which are incorporated herein by this reference in their entireties.

BACKGROUND

Technical Field

The present disclosure relates to tailgates and, specifically, to aerodynamic features of a plastic glazing of a tailgate of a vehicle.

Technical Background

Vehicles such as sports utility vehicles ("SUVs"), vans, hatchbacks, and the like include a structural component known as a tailgate. The tailgate is provided to open or close an opening formed at a rear portion of a vehicle. The tailgate is typically hinged to the main vehicle body, for example, along its upper end, such that it can swing open and close. Examples of tailgates include a rear door tailgate or a truck lid tailgate.

The tailgate may support one or more other vehicle components, such as a rear glass window and one or more light assemblies (e.g., a supplemental brake light, a puddle light). The tailgate may also be adjacent to body cavities into which rear lamp units are inserted. These parts and other parts may add to the cost and complexity of assembling a vehicle.

Light assemblies in vehicles, in particular, comprise a large number of separate components. For example, a typical vehicle may have several different types of lights, including, for example, parking lights, turn indicator lights, brake lights, and the like. Each of these lights may be made from many parts. These parts add to the cost and complexity of assembling a vehicle. Accordingly, as recognized in U.S. Pat. No. 7,048,423 ("the '423 patent"), it is desirable to have a lighting assembly with fewer parts. The '423 patent discloses an integrated light assembly including a plurality of lamps 210, 216 enclosed in a housing 202, which may serve as a lens for the lamps, and mounted on a substrate 204. Because the lamps 210, 216 share a common substrate and lens, the additional cost of having a separate lamp unit is eliminated. This structure disclosed in the '423 patent, however, has many drawbacks. For one, because multiple lamps are mounted together in a single housing without sidewalls or reflectors for directing the angle of their light, the structure does not account for haziness issues. Moreover, if two lights of varying color are mounted in the housing, the structure disclosed in the '423 patent does not have a way of preventing color overlap. These drawbacks may limit the use of such a light assembly in a vehicle under state and federal regulations governing vehicle lighting requirements. Thus, while the '423 patent discloses an integrated part for a vehicle, its application may be limited.

Inhomogeneities such as seams and openings between separate vehicle components may also add to the cost of assembling, sealing and/or insulating an interior of the vehicle and/or its components. Moreover such seams and openings may cause aerodynamic inefficiencies and disturb the vehicle's overall aesthetical appearance. Additional components may also be required to connect separate vehicle components to one another, which may add to the overall weight of a vehicle.

Many vehicles also include aerodynamic features such as a spoiler or a rear wing. Vehicles may further include one or more functional openings such as, for example, an opening for ventilating an interior of the vehicle, an opening for controlling an interior pressure of the vehicle, an opening for defogging a surface of the vehicle, and the like. These aerodynamic features and openings may require additional components to be installed in a vehicle. These additional components may add to the cost and time of assembling a vehicle. These additional components may also add to an overall weight of the vehicle.

The present disclosure aims to solve these problems and other problems in the prior art.

SUMMARY

In accordance with the purpose(s) of the invention, as embodied and broadly described herein, this disclosure, in one aspect, relates to vehicle components, including tailgates, and to aerodynamic features of a plastic glazing of a tailgate.

As will be apparent from the present disclosure, problems and/or objectives for improvement with respect to a tailgate including plastic glazing, as described herein, may include providing a tailgate that integrates one or more other components of a vehicle, thereby reducing a total number of components of a vehicle and reducing the complexity and cost of assembling a vehicle. Such problems and/or objectives for improvement also may include providing a tailgate that reduces a number of inhomogeneities, seams, and other disruptions, interruptions, and gaps along a surface of a vehicle, thereby increasing an aesthetic appearance of the vehicle and increasing aerodynamic performance. Such problems and/or objectives for improvement further may include providing a tailgate that conceals one or more other features of a vehicle, such as, for example, a light unit or assembly, thereby increasing an aesthetic appearance of the vehicle.

Problems and/or objectives for improvement with respect to a tailgate, as described herein, may also include providing a tailgate with integrated aerodynamic features such as, for example, a spoiler or a rear wing. Such problems and/or objectives for improvement may also include providing a tailgate with integrated openings for ventilating an interior of a vehicle, controlling cabin pressure, and the like. The aerodynamic features and/or openings may be formed in a plastic glazing of the tailgate during an injection molding process. As such, aspects of the present disclosure may simplify the manufacture of aerodynamic features and/or openings and their attachment to a vehicle.

Accordingly, aspects of the present disclosure provide a plastic glazing of a tailgate of a vehicle, the plastic glazing comprising: a first translucent component comprising a full panel of the plastic glazing; a second translucent component molded onto the first translucent component, wherein the second translucent component is a colored thermoplastic polymer, wherein the plastic glazing is of one-piece molded plastic construction, wherein at least one of the first translucent component and the second translucent component comprises one or more aerodynamic features, wherein the one or more aerodynamic features are each configured to reduce one or more of: a turbulence, a drag force, and a lift force.

Other aspects of the present disclosure provide a plastic glazing of a tailgate of a vehicle, the plastic glazing comprising: a first translucent component comprising a full panel of the plastic glazing; a second translucent component molded onto the first translucent component, wherein the second translucent component is a colored thermoplastic polymer, wherein the plastic glazing is of one-piece molded plastic construction, wherein at least one of the first translucent component and the second translucent component comprises one or more functional openings.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description, is better understood when read in conjunction with the appended drawings. There is shown in the drawings example embodiments, and the present invention is not intended to be limited to the specific embodiments and methods disclosed.

DESCRIPTION

Aspects of the disclosure will now be described in detail with reference to the drawings, wherein like reference numerals designate identical or corresponding parts throughout the several views, unless specified otherwise.

Systems and methods disclosed herein provide a tailgate or lift gate and, in particular, a tailgate having a plastic glazing having a one-piece monolithic construction. The one-piece monolithic structure can be fabricated in one piece using an injection molding process. Vehicles of a hatchback or van configuration typically include an access opening at their rear and a tailgate that selectively opens and closes the access opening. The tailgate may be mounted on the main body of the vehicle using a hinged connection. As such, the tailgate may operate like a hinged flap, which swings open and close along the hinged connection. The tailgate is typically operated manually but may also be operated electronically using a power actuator.

The tailgate may support one or more other vehicle components such as a rear window, a logo or marking, a light unit or assembly, a license plate holder, etc. These components are usually attached to the tailgate using screws or other connectors or an adhesive. In its closed position, the tailgate may also be adjacent to one or more cavities in the body of the vehicle for receiving a rear lamp unit or other light unit.

In order to reduce the number of separate components of a vehicle, systems and methods disclosed herein may provide an integrated tailgate assembly including and/or integrating one or more other vehicle components. For example, systems and methods disclosed herein may provide a tailgate having a plastic glazing including a rear window. The plastic glazing of the tailgate may be constructed of a thermoplastic polymer including a portion that is clear as the rear window. In other systems and methods disclosed herein, additional vehicle components may also be included in the plastic glazing. Such components may include, for example, a colored translucent portion for a rear light unit; an additional translucent portion for a courtesy light, a license plate light, or other light unit; a cavity and fixation unit (e.g., a threaded hole, a hook or clip) for supporting a light unit; a cavity and fixation unit for supporting a license plate; a textured and/or raised region for a logo or other marking; a spoiler or other aerodynamic feature; an opening that serves as a ventilation opening; and the like.

Systems and methods disclosed herein may also provide a tailgate that reduces a number of inhomogeneities, seams, and other disruptions, interruptions, and gaps along a surface of a vehicle, thereby increasing an aesthetic appearance of the vehicle and increasing aerodynamic performance. Systems and methods disclosed herein further may provide a tailgate that conceals one or more other features of a vehicle, such as, for example, a light unit, thereby increasing an aesthetic appearance of the vehicle.

Systems and methods disclosed herein may also provide a method of manufacturing a tailgate or, specifically, a plastic glazing of a tailgate. Such systems and methods may provide a method of producing a plastic glazing using multi-shot injection molding techniques. For example, in certain aspects of the disclosure, a plastic glazing of a tailgate may be formed via a three-shot injection molding process. In a first shot, a clear thermoplastic polymer may be injected to form a shell or outline of the plastic glazing. In a second shot, a colored thermoplastic polymer may be injected to form one or more colored regions in the plastic glazing. For example, a red thermoplastic polymer may be injected to form a red translucent region to serve as the lens for a rear light of a vehicle.

Systems and methods disclosed herein may also provide a plastic glazing of a tailgate having integrated aerodynamic features. The aerodynamic features may be, for example, a spoiler (e.g., a component that controls air flow separation and optimizes air flow around a vehicle in order to reduce drag or increase downforce), a rear wing (e.g., a component that optimizes air flow around a vehicle, e.g., in order to reduce drag or increase downforce), a diffuser (e.g., a component for controlling the airflow beneath a vehicle and/or increasing downforce on that vehicle), or the like. The aerodynamic features may be integrated into the plastic glazing such that these form a single component with the plastic glazing. The aerodynamic features may be formed as part of an injection molding process. For example, the plastic glazing may be formed using a mold cavity that is specifically designed to shape a portion of the plastic glazing into an aerodynamic feature, such as, for example, a spoiler. Systems and methods disclosed herein may also provide a light disposed on an aerodynamic feature, such as, for example, a light disposed on a spoiler. This light may be a brake light, a puddle light, etc.

Systems and methods disclosed herein may also provide a plastic glazing of a tailgate having one or more openings. The one or more openings may serve a number of different functions. For example, a plastic glazing may have an opening for ventilating an interior of the vehicle. The plastic glazing may also have an opening for controlling cabin pressure within the vehicle. The plastic glazing may further have an opening for defogging an interior surface of the vehicle, such as a portion of the plastic glazing that functions as a light lens. The one or more openings may be disposed at strategic locations on the plastic glazing such that their appearances are minimized. In particular, the one or more openings may be placed along the edges of blackout portions or colored portions such that the color transition obscures their presence. Such placement may increase the aesthetical appearance of the tailgate.

Figure 1:
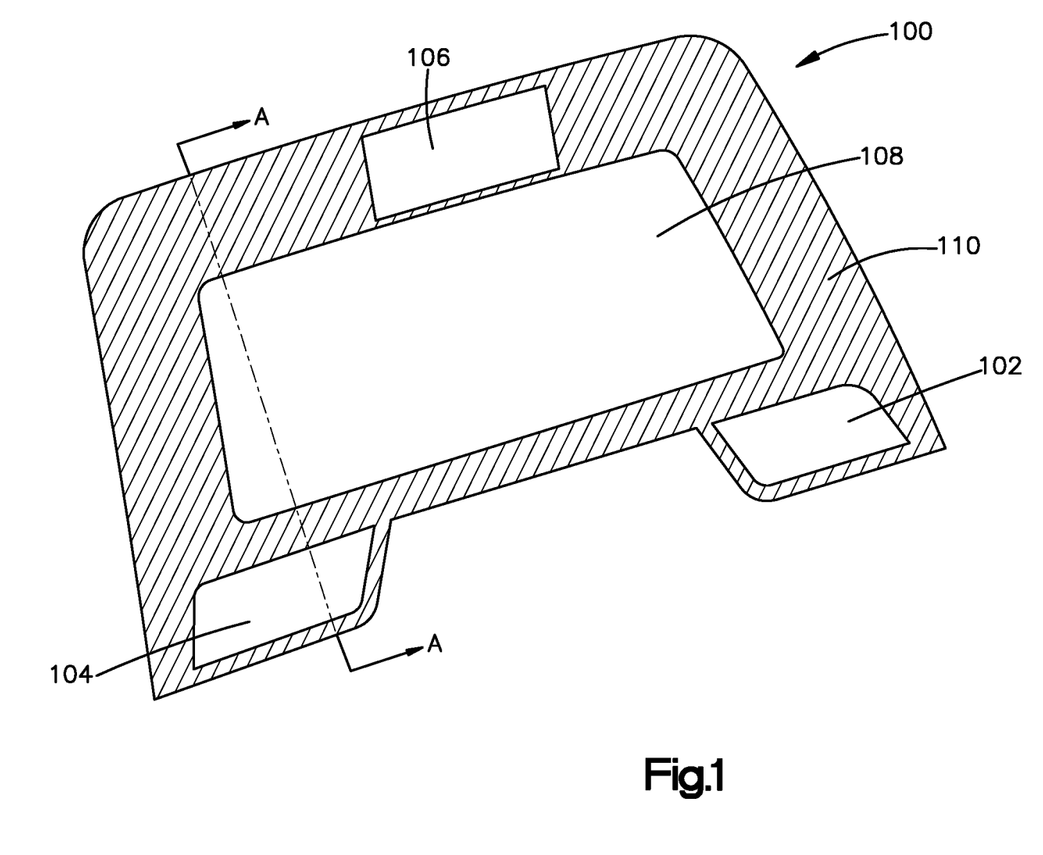
FIG. 1 is a schematic view of a front of a first exemplary plastic glazing of a tailgate in accordance with an embodiment of the present disclosure.

Referring now to FIG. 1, an exemplary plastic glazing 100 of a tailgate of a vehicle is depicted. The plastic glazing 100 may be a one-piece monolithic structure formed of one or more thermoplastic polymers. Examples of suitable thermoplastic polymers include: polycarbonate, polyester carbonate, poly methyl methacrylate, and the like. According to a preferred aspect of the disclosure, the plastic glazing 100 may be formed of a polycarbonate. The plastic glazing 100 may have an outer surface that is seamless, i.e., lacking any visual openings, junctions, disruptions, interruptions, gaps, or the like.

The plastic glazing 100 has a first colored portion 102 that functions as a portion of a right tail lamp of the vehicle, and a second colored portion 104 that functions as a portion of a left tail lamp of the vehicle. In particular, the colored portions 102, 104 may function as lenses of the tail lamps of the vehicle. The plastic glazing 100 also has a third portion 106 for an additional light unit such as, for example, an axillary brake light or a courtesy light. The plastic glazing 100 also includes a clear translucent portion 108 that functions as a rear window of the vehicle, and a colored non-transparent portion 110. The colored non-transparent portion may be strategically placed to hide one or more structures positioned behind the plastic glazing 100.

Figure 2:
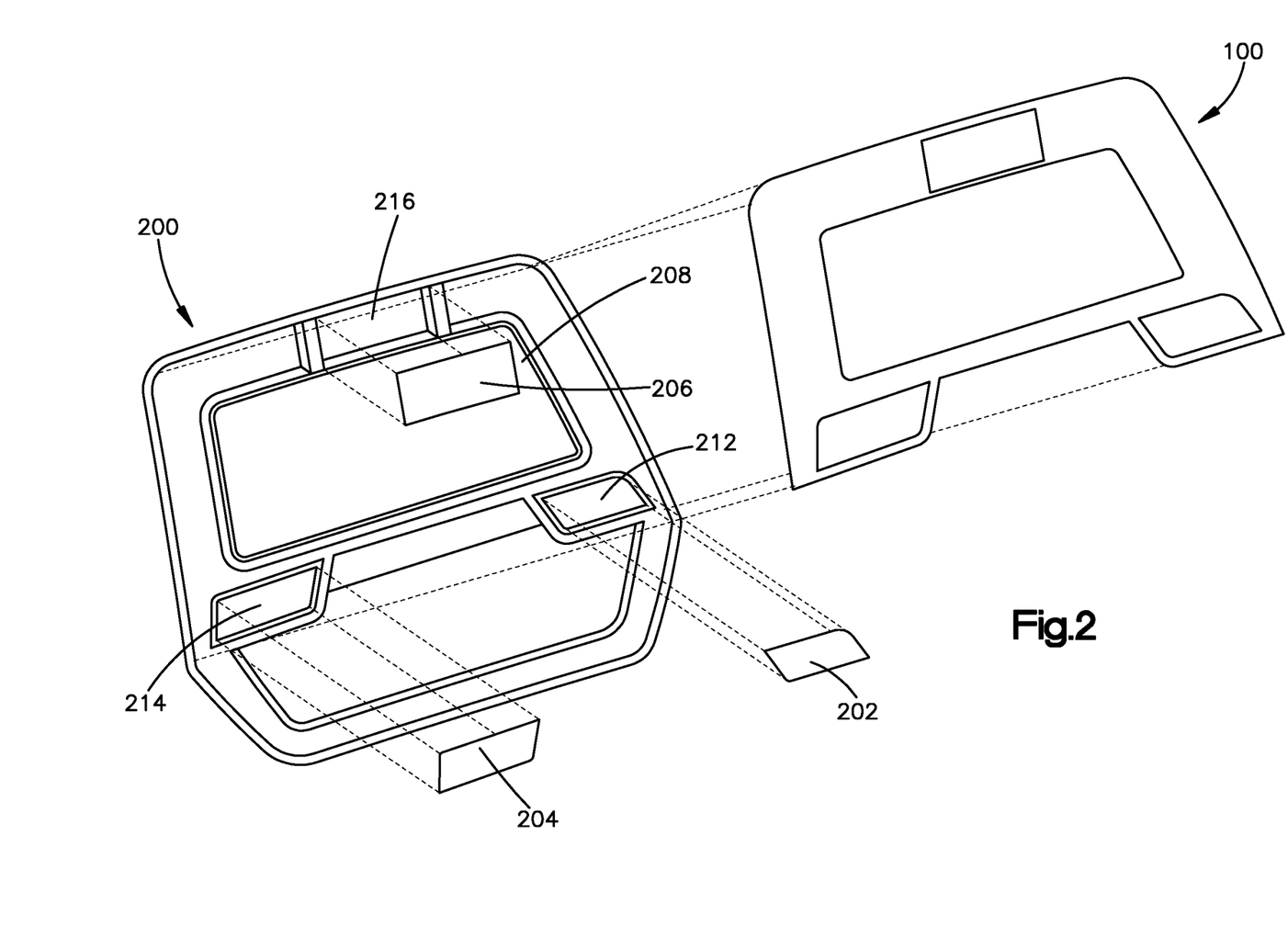
FIG. 2 is a deconstructed view of a tailgate assembly including the first exemplary plastic glazing depicted in FIG. 1 and a housing unit in accordance with an embodiment of the present disclosure.

Referring now to FIG. 2, a housing unit 200 of a tailgate is depicted. The housing unit 200 may be formed of a fiber-reinforced polymer. According to a preferred aspect of the disclosure, the housing unit 200 may be formed of a long-glass fiber-reinforced polypropylene such as, for example, SABIC® STAMAX™ plastic. As depicted in FIG. 2, the housing unit 200 comprises one or more cavities for receiving a light unit. In particular, the housing unit 200 comprises a first cavity 212 for receiving a first light unit 202, a second cavity 214 for receiving a second light unit 204, and a third cavity 216 for receiving a third light unit 206. The light units 202, 204, 206 may be fixed directly onto the housing unit 200 via access doors and/or using mechanical fasteners (e.g., screw, bolt, and the like). The cavities 212, 214, 216 may prevent light from the light units from bleeding outside of a confined space. As such, additional cavities (not depicted) may be formed next to the cavities 212, 214, 216 for holding additional light units, and the cavities would prevent the light generated by one light unit from bleeding into a space reserved for another light unit.

The light units 202, 204, 206 may be a single type of light unit. For example, the light units 202, 204, 206 may be brake light units. Alternatively, the light units 202, 204, 206 may comprise more than one kind of light unit. For example, the light units 202, 204 may be brake light units, and the light unit 206 may be a courtesy light unit.

The plastic glazing 100 may be secured to the housing unit 200 such that the light units 202, 204, 206 are disposed between the plastic glazing 100 and the housing unit 200. In particular, the plastic glazing 100 may be secured to the housing unit 200 such that the light units 202, 204, 206 are disposed behind the portions 102, 104, 106 (depicted in FIG. 1). The light unit 202 may be disposed behind the first colored portion 102, the light unit 204 may be disposed behind the second colored portion 104, and the light unit 206 may be disposed behind the third portion 106.

Light emitted from the light units 202, 204, 206 through the portions 102, 104, 106 of the plastic glazing 100 may be emitted as a colored light in accordance with certain international standards governing vehicle lighting such as, for example, ECE Regulation No. 48 and SAE Standard J578. As noted above, the portions 102, 104 may function as the lens for the vehicle's tail lamps. Accordingly, light emitted from the light units 202, 204 through the portions 102, 104 may be red. ECE Regulation No. 48 defines the color "red" as emitted light with chromaticity coordinates (x,y) that lie within the chromaticity areas defined by the following boundaries in the CIE xyY color space:

| | | |
|---|---|---|
| $R_{12}$ | yellow boundary: | y = 0.335 |
| $R_{23}$ | the spectral locus | |
| $R_{34}$ | the purple line | |
| $R_{41}$ | purple boundary: | y = 0.980 − x |

With the following (x,y) intersection points:
$R_1$: (0.645,0.335)
$R_2$: (0.665,0.335)
$R_3$: (0.735,0.265)
$R_4$: (0.721,0.259)

Thus, to fulfill this regulation, the light emitted through the portions 102, 104 may have chromaticity coordinates (x,y) that fall within the chromaticity area defined for the color red in ECE Regulation No. 48, as set forth above.

While the portions 102, 104 and the light units 202, 204 are described herein as producing a red light, one of ordinary skill in the art would appreciate that the portions 102, 104 and the light units 202, 204 may also be designed to produce lights having other colors, such as, for example, yellow or amber. These colors are also defined in ECE Regulation No. 48 as well as in other international standards.

The housing unit 200 also includes an opening 208. When the plastic glazing 100 is secured to the housing unit 200 such that the light units 202, 204, 206 line up with the portions 102, 104, 106, the opening 208 may line up with the clear translucent portion 108 of the plastic glazing 100. By lining up with the clear translucent portion 108, the opening 208 allows an individual's view through the translucent portion 108 (which, as described above, may function as the rear window of the vehicle) to remain unobstructed.

Each of the light units 202, 204, 206 may include one or more light components such as, for example, an incandescent lamp, an electroluminescent lamp, a gas discharge lamp, and the like. Because the light units 202, 204, 206 are secured directly onto the housing unit 200, a separate housing for each light unit 202, 204, 206 may not be needed. Thus, the housing unit 200, which serves as the structural carrier for the plastic glazing 100 of the tailgate, integrates a housing function of a light unit. Moreover, because the portions 102, 104, 106 may function as the lens of a light unit—i.e., the portion 102 may function as the lens for the light unit 202, the portion 104 may function as the lens for the light unit 204, and the portion 106 may function as the lens for the light unit 206—a separate lens for each light units 202, 204, 206 also may not be needed.

The plastic glazing 100 may be secured to the housing unit 200 using an adhesive and/or a mechanical fastening system (e.g., a screw bolt or clip fastening system). The adhesive used may be a commercially available adhesive that is typically used in the automotive industry for the adhesive bonding of plastic components. Such adhesives may include, for example, wet adhesives, contact adhesives, hot-melt adhesives, or reaction adhesives. The thickness of the adhesive required may vary depending on the specific geometries of the plastic glazing 100 and the housing unit 200. When the adhesive is a hot-melt adhesive that can be processed under thermoplastic conditions, it may be possible to bond the plastic glazing 100, the housing unit 200, and the hot-melt adhesive together during a multi-shot injection molding process.

While the tailgate including the plastic glazing 100 and the housing unit 200 is depicted as having three light units 202, 204, 206, one of ordinary skill in the art would appreciate that the tailgate may comprise less or more light units. Such light units may include, for example, license plate lamps, turn signal lamps, backup lamps, and the like.

Figure 3:
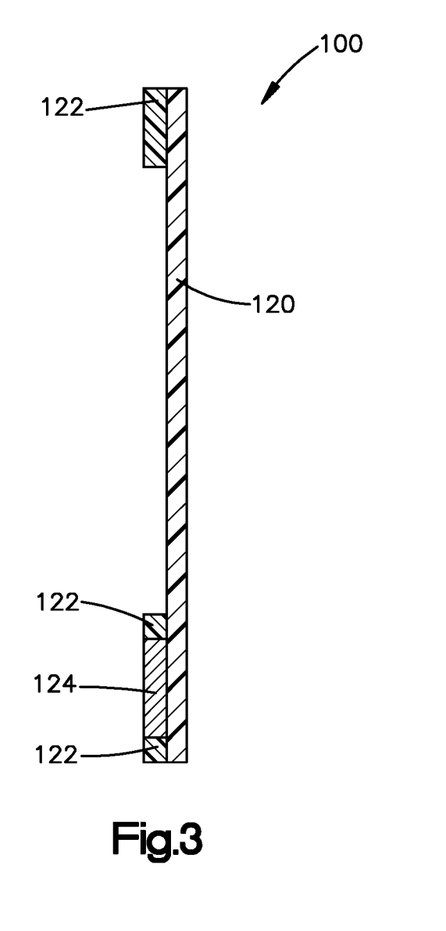
FIG. 3 is a cross-sectional view of the first exemplary plastic glazing depicted in FIG. 1.

Referring now to FIG. 3, a cross-sectional view of the plastic glazing 100 along the line A-A is depicted. As depicted in FIG. 3, the plastic glazing 100 may comprise multiple thermoplastic polymers. The plastic glazing 100 may comprise a clear translucent component 120, a dark or blackout component 122, and a colored component 124. Each component may be formed by a different thermoplastic polymer such as, for example, different colored polycarbonate resins. The translucent component 120 may be formed of a clear thermoplastic polymer to provide a clear unobstructed view there through. In certain aspects, the translucent component 310 may comprise a certain degree of color but nonetheless retain sufficient transparency to allow a high degree of light transmittance. For example, the translucent component 310 may comprise a tint, such as a grey, green, or brown tint. The dark component 122 may be a black or other colored non-transparent thermoplastic polymer that is configured to control light transmission through the translucent component 120. In particular, the dark component 122 may be optimally positioned on the plastic glazing 100 to conceal one or more vehicle components disposed behind the plastic glazing 100 such as, for example, a housing unit. The dark component 122 may also conceal any adhesive of fixation mechanisms used to attach the plastic glazing to a housing unit or other component of the tailgate.

The translucent component 120 may be in a first layer, and the dark component 122 and the colored component 124 may be in a second layer separate from the first. The translucent component 120, the dark component 122, and the colored component 124 may have the same thickness or different thicknesses. In an aspect of the disclosure, the translucent component 120 may have a thickness that is greater than that of the dark component 122 and the colored component 124. The translucent component 120 may have a greater thickness in order to provide structural strength to the plastic glazing 100. In another aspect of the disclosure, the thickness of the dark component 122 may be increased in order to provide additional structural support to an outer panel of the plastic glazing 100 along which the dark component 122 is disposed.

The translucent component 120 may define a panel or overall shell of the plastic glazing 100. The dark component 122 and the colored component 124 may be disposed behind the translucent component 120 towards an interior of a vehicle. By being disposed behind the translucent component 120, the dark component 122 and the colored component 124 may be protected from weathering effects. Moreover, the dark component 122 and the colored component 124 would not create any inhomogeneities or raised portions on a surface of the vehicle.

A first portion of the clear translucent component 120 that does not overlap the dark component 122 and the colored component 124 in the longitudinal direction (i.e., a direction along the line A-A) may form the translucent portion 108 that functions as the rear window of the vehicle. The colored component 124 and a second portion of the clear translucent component 120 that overlaps the colored component 124 in the longitudinal direction may form the colored portion 104 that functions as a lens of a tail lamp unit. And the dark component 122 and additional portions of the clear translucent component 120 that overlap the dark component 122 in the longitudinal direction may form the non-transparent portion 110.

The plastic glazing 100 may be manufactured or produced using an injection molding technique. In particular, the plastic glazing 100 may be produced using a three-shot injection molding technique. The three-shot injection molding technique may use a mold cavity that can be altered between different volumes. The mold cavity may be an example of a molding apparatus. The mold cavity may be set to a first volume for receiving a first shot of material. The first shot of material may form the translucent component 120. Accordingly, the mold cavity may be set to a volume corresponding to that of the translucent component 120. A first material may be injected into the mold cavity to form the translucent component 120. The first material may be a clear, translucent thermoplastic polymer such as, for example, a clear polycarbonate. After the first shot has been injected, the mold cavity may be changed from its first volume into a second volume.

The next shot of material may form the colored component 124. Accordingly, the mold cavity may be set to a volume corresponding to that of the colored component 124. A second material may be injected into the mold cavity to form the colored component 124. The second material may be a similar type of material as the first material so that heat released by the second material along the edge of the first material may melt and fuse (i.e., combine) the colored component 124 to the clear translucent component 120. As such, if the first material is a clear polycarbonate, the second material may be a colored polycarbonate, such as, for example, a red polycarbonate. After the second shot has been injected, the mold cavity may be changed from its second volume to a third volume. The third and final shot of material may form the dark component 122. Accordingly, the mold cavity may be set to a volume corresponding to that of the dark component 122. Such may involve taking into account the portion of the cavity already filled by the first and second shots. A third material may be injected into the mold cavity to form the dark component 122. The third material also may be a similar type of material as the first and second materials such that heat released by the third material along the end of the first and second materials may melt and fuse the other components to the dark component 122. After the third shot, the entire molded assembly may be left to cool.

According to certain aspects of the disclosure, the order of the second shot and the third shot may be changed. Thus, instead of injecting the second material to form the colored component 124 in the second shot, the third material for forming the dark component 122 may be injected during the second shot. In such aspects, the mold cavity may be adjusted first to a volume corresponding to the dark component 122 and then to a volume corresponding to the colored component 124.

Figure 4:
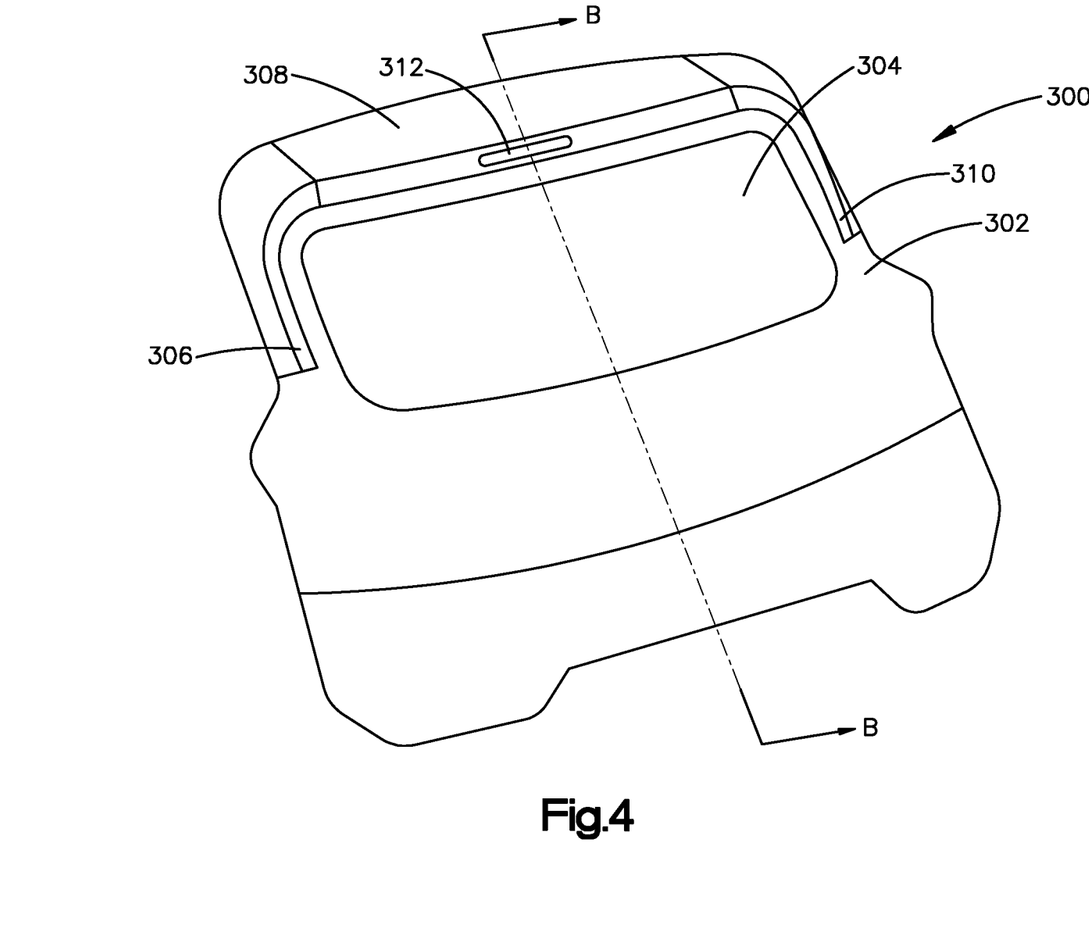
FIG. 4 is a schematic view of a front of a second exemplary plastic glazing of a tailgate having an aerodynamic feature in accordance with an embodiment of the present disclosure.

Referring now to FIG. 4, an exemplary plastic glazing 300 of a tailgate of a vehicle is depicted. The tailgate glazing 300 may be of one-piece monolithic molded plastic construction, and may have an outer surface that is substantially free of any inhomogeneities, seams, and other disruptions, interruptions, and gaps.

As depicted in FIG. 4, the plastic glazing 300 has a non-transparent portion 302 and a clear translucent portion 304. The clear translucent portion 304 may function as a rear window of the vehicle. The non-transparent portion 302 may surround the clear translucent portion 304, thereby outlining the rear window of the vehicle.

The plastic glazing 300 also has a spoiler having a first section 306, a second section 308, and a third section 310. The first section 306, the second section 308, and the third section 310 may form a continuous spoiler. The first section 306 may be disposed vertically along a first side, or, specifically, a left side, of the plastic glazing 300. The third section 310 may be disposed vertically along a second side, or, specifically, a right side, of the plastic glazing 300. As such, the first section 306 and the third section 310 may be disposed in side portions that are opposite to one another. The second section 308 may be disposed horizontally across a top region of the plastic tailgate 300. The second section 308 may comprise a light 312.

While the plastic glazing 300 is depicted as having a single spoiler formed of three sections, one of ordinary skill in the art would recognize that other types of spoilers may also be integrated into the plastic glazing 300. For example, the plastic glazing 300 may comprise two separate spoilers, in which each spoiler is located along a side of the plastic glazing 300. As another example, the plastic glazing 300 may also comprise a single spoiler having one section disposed horizontally across a top portion of the plastic glazing 300.

Figure 5:
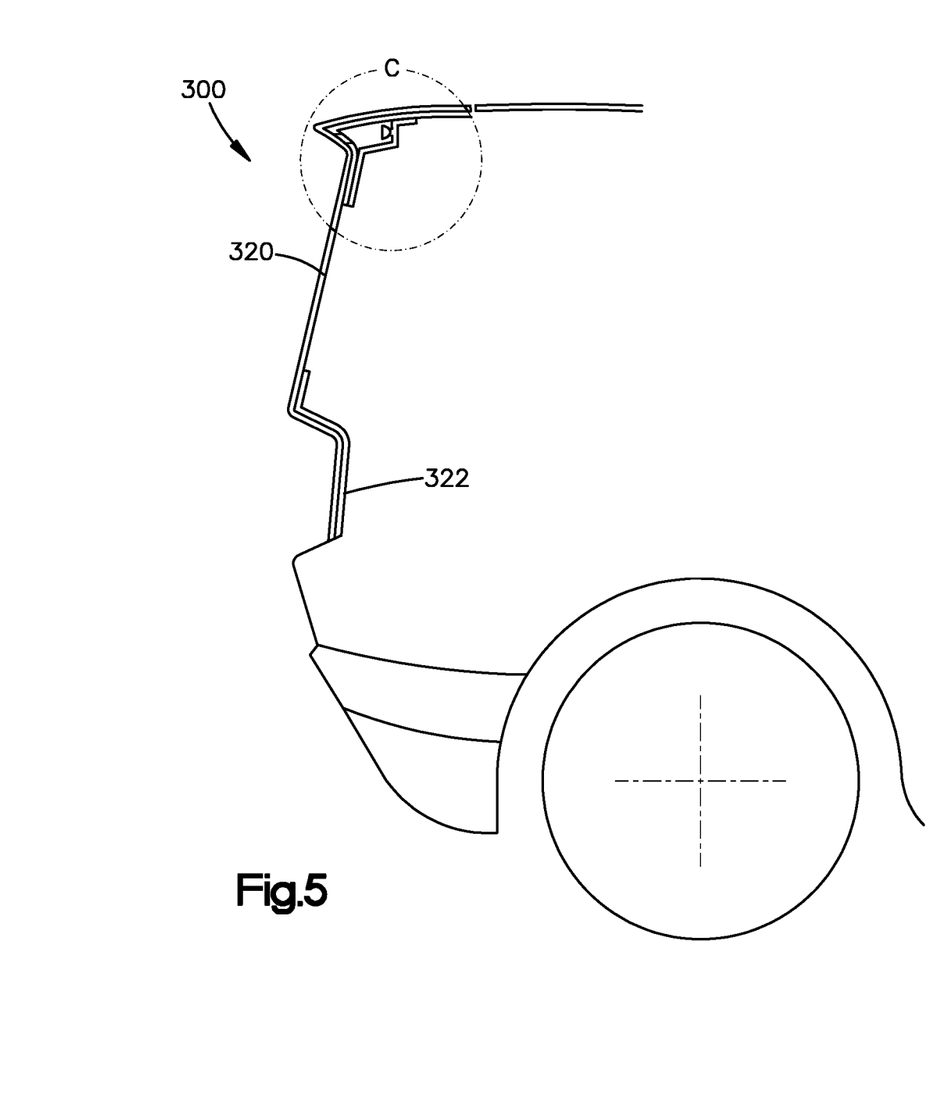
FIG. 5 is a cross-sectional view of a vehicle having the second exemplary plastic glazing depicted in FIG. 4.

FIG. 5 depicts a cross-sectional view of the plastic glazing 300 along the line B-B. As depicted in FIG. 5, the plastic glazing 300 may be formed of various thermoplastic components, including a first component 320 and a second component 322. The first component 320 may be a clear component, and the second component 322 may be a non-transparent component. The second component 322 may be disposed behind the first component 320 towards an interior of the vehicle. As such, the second component 322 does not create any inhomogeneities or raised portions on an exterior surface of the plastic glazing.

Figure 6:
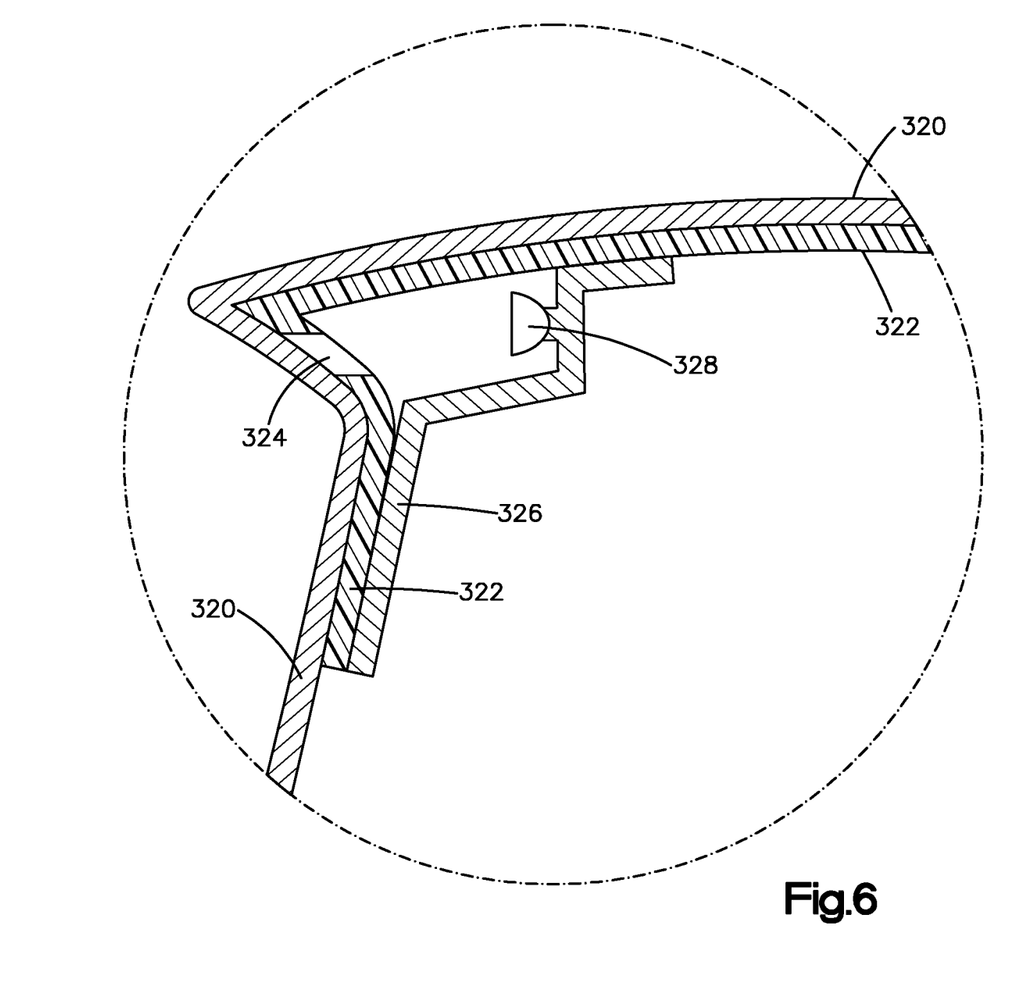
FIG. 6 is an enlarged view of the cross-sectional view of the vehicle having the second exemplary plastic glazing depicted in FIG. 5.

FIG. 6 depicts an enlarged view of a region C of the cross-sectional view depicted in FIG. 5. FIG. 6 provides a close-up of the light 312 disposed on the second section 308 depicted in FIG. 4. As depicted in FIG. 6, the light 312 may have a light unit 328 that is supported by a housing unit 326. The housing unit 326, like the housing unit 200 depicted in FIG. 2, may be formed of a fiber-reinforced polymer such as, for example, SABIC® STAMAX™ plastic.

The housing unit 326 is attached to a portion of the non-transparent component 322 of the plastic glazing 300. The housing unit 326 may be attached to the non-transparent component 322 using an adhesive. The adhesive used may be a commercially available adhesive that is typically used in the automotive industry for the adhesive bonding of plastic components such as, for example, wet adhesives, contact adhesives, hot-melt adhesives, or reaction adhesives.

As depicted in FIG. 6, the plastic glazing 300 may also comprise a third thermoplastic component 324. The third component 324 may be another translucent component. An overlapping region of the first component 320 and the third component 324 may function as a lens of the light 312. Surrounding the overlapping region of the first component 320 and the third component 324 may be overlapping regions of the first component 320 and the second component 322. The overlapping regions of the first component 320 and the second component 322 may be non-transparent due to the non-transparent nature of the second component 322. As such, light beams emitted by the light unit 328 may be selectively transmitted to an exterior of the vehicle through the overlapping region of the first component 320 and the third component 324. The overlapping regions of the first component 320 and the second component 322 may conceal where the housing unit 326 is attached to the plastic glazing 300 when viewed from an exterior of the vehicle.

In certain aspects, one or more of the first component 320 and the third component 324 may be a colored thermoplastic. Accordingly, light beams that travel through the overlapping region of the first component 320 and the third component 324 may also be colored. Similar to what was described above with respect to the portions 102, 104, 106 that functioned as the lens for the light units 202, 204, 206 depicted in FIGS. 1 and 2, the colors of the first component 320 and the third component 324 may be adjusted to control the color of the light beams that are emitted by the light 312. In particular, the colors of the first component 320 and the third component 324 may be configured to produce a light to have a red color or an amber color.

The second section 308 of the spoiler, as well as the first section 306 and the third section 310 of the spoiler (depicted in FIG. 4), may be formed as part of an injection molding process for forming the plastic glazing 300, similar to the one described above with respect to the plastic glazing 100 depicted in FIGS. 1-3. In a first shot, a translucent thermoplastic material may be injected into a mold cavity having a first volume to form the first component 320. After the clear translucent component is formed, the mold cavity may be adjusted to a second volume and so on and so forth for receiving additional shots of material. The different volumes of the mold cavity may be configured to form the sections 306, 308, 310 of the spoiler.

Figure 7:
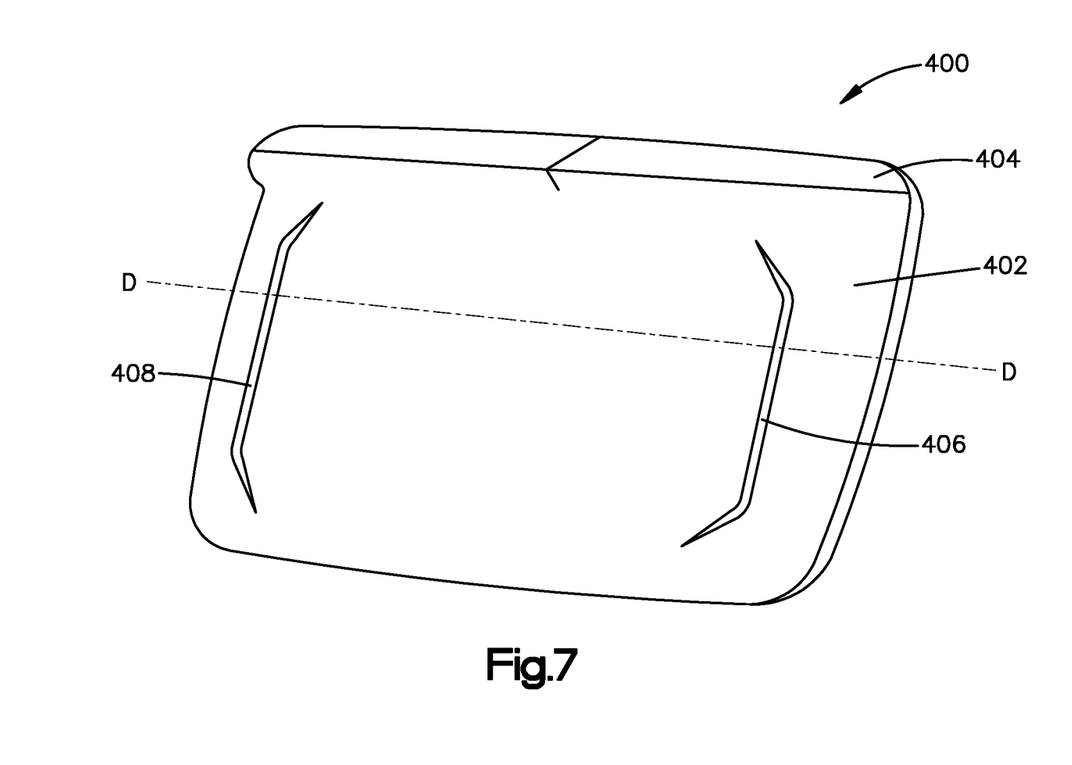
FIG. 7 is a schematic view of a front of a third exemplary plastic glazing of a tailgate having functional openings in accordance with an embodiment of the present disclosure.

Referring now to FIG. 7, an exemplary plastic glazing 400 of a tailgate of a vehicle is depicted. The plastic glazing 400 comprises a main body 402. The plastic glazing 400 also comprises an aerodynamic feature 404 such as a spoiler. The plastic glazing 400 further comprises two openings 406, 408.

Figure 8:
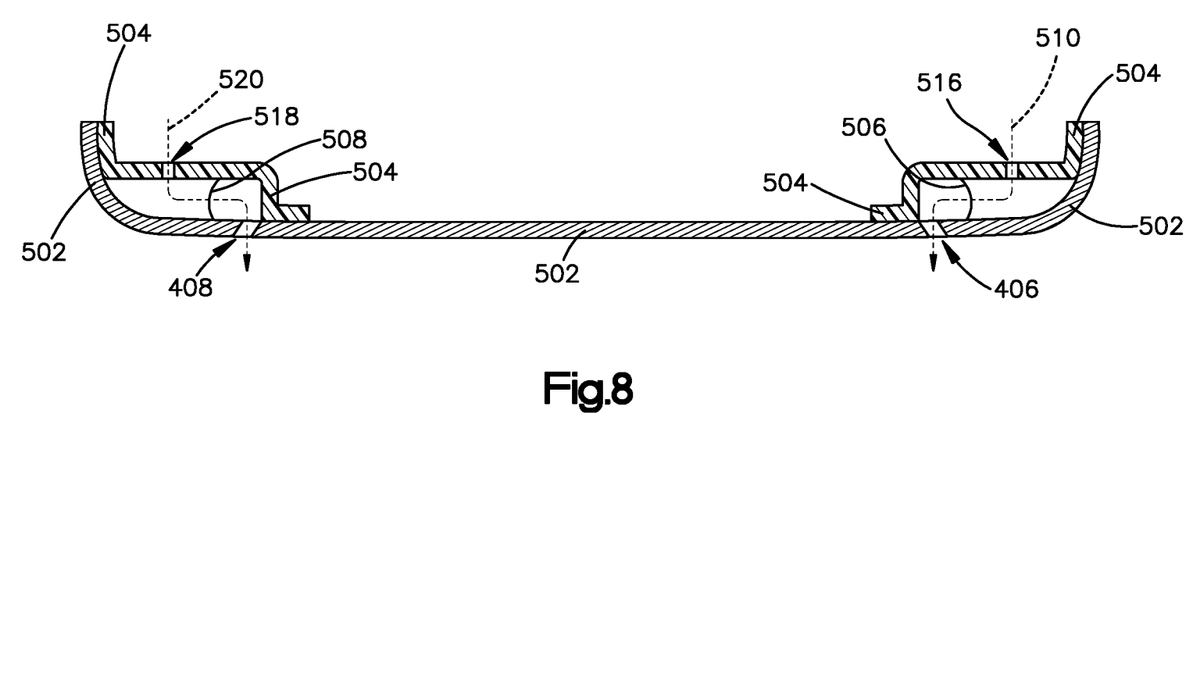
FIG. 8 is a cross-sectional view of the third exemplary plastic glazing depicted in FIG. 7.

FIG. 8 depicts a cross-sectional view of the plastic glazing 400 along the line D-D with a housing unit 504 disposed behind the plastic glazing 400 towards an interior of the vehicle. The main body 402 of the plastic glazing 400 may comprise a thermoplastic component 502. The thermoplastic component 502 may be a translucent component. While the plastic glazing 400 is depicted in FIG. 8 as having a single thermoplastic component, one of ordinary skill in the art would recognize that the plastic glazing 400 may also comprise additional components, such as a non-transparent or blackout (e.g., opaque or substantially opaque) component or an additional translucent component. The non-transparent component may be black or be another color and/or effect.

The housing unit 504 may be attached to the thermoplastic component 502 of the plastic glazing 400. As described above, such may be accomplished using an adhesive or other fixation system. Along the cross-sectional cut D-D, the housing unit 504 may be broken into multiple sections (e.g., a section to the right, and a second to the left). Nonetheless, the housing unit 504 may be formed of one continuous piece.

The two openings 406, 408 may be disposed on the thermoplastic component 502. The two openings 406, 408 may be offset from two additional openings 516, 518 disposed on different sections of the housing unit 504. The openings 406, 408, 516, 518 may form two air flow paths. Specifically, a first airflow path 510 may run through the opening 516, pass a valve 506, and out through the opening 406. And a second airflow path 520 may run through the opening 518, pass a valve 508, and out through the opening 408. The airflow paths 510, 520 may allow air from within the vehicle to exit the vehicle through the openings 406, 408, 516, 518.

The valves 506, 508 disposed along the airflow paths 510, 520 may control the flow of air to the outside. In an aspect of the disclosure, the values 506, 508 may only allow air from within the vehicle to pass through to the openings 406, 408 when a threshold pressure is exceeded in a main cabin of the vehicle. As such, the valves 506, 508 may be configured to stabilize an interior pressure of the vehicle. In another aspect of the disclosure, the valves 506, 508 may freely allow air to travel in both directions through the openings 406, 408, 516, 518 but may prevent water and other liquids from travelling from outside of the vehicle into the vehicle. In yet another aspect of the disclosure, the valves 506, 508 may be controlled by an on-board computer such that they may open and close to permit the passage of air in and out of the vehicle to achieve various functional objectives, such as, for example, to defog an interior surface of the vehicle or to stabilize cabin pressure.

According to certain aspects of the disclosure, the tailgate assembles disclosed herein may also include additional layers on top of the thermoplastic polymer layers. For example, a layer for increasing scratch resistance may be added to an exterior surface of the plastic glazing. As another example, an additional layer for adding more support to the thermoplastic polymer layers may also be added to an interior surface of the plastic glazing. This additional layer may be formed of a plastic, a metal, or other material for increasing the structural strength of the tailgate.

It will be appreciated that the present disclosure may include any one and up to all of the following examples.

Example 1

A plastic glazing of a tailgate of a vehicle, the plastic glazing comprising: a first translucent component comprising a full panel of the plastic glazing; a second translucent component molded onto the first translucent component, wherein the second translucent component is a colored thermoplastic polymer, wherein the plastic glazing is of one-piece molded plastic construction, wherein at least one of the first translucent component and the second translucent component comprises one or more aerodynamic features.

Example 2

The plastic glazing of Example 1, wherein the one or more aerodynamic features comprises a spoiler.

Example 3

The plastic glazing of any of Examples 1 and 2, wherein an overlapping portion of the first translucent component and the second translucent component forms a lens of a light unit.

Example 4

The plastic glazing of Example 3, wherein the light unit is disposed on the spoiler.

Example 5

The plastic glazing of any one of Examples 3 and 4, wherein the light unit is a brake light.

Example 6

The plastic glazing of any one of Examples 3 and 4, wherein the light unit is a puddle light.

Example 7

The plastic glazing of Example 2, wherein the spoiler comprises a first section disposed horizontally along a top portion of the plastic glazing.

Example 8

The plastic glazing of Example 7, wherein the spoiler further comprises a second section disposed vertically along a first side portion of the plastic glazing.

Example 9

The plastic glazing of Example 8, wherein the spoiler further comprises a third section disposed vertically along a second side portion of the plastic glazing, wherein the first side portion and the second side portion are opposite to one another.

Example 10

The plastic glazing of Example 9, wherein the first section, the second section, and the third section of the spoiler are connected to each other to form a continuous component.

Example 11

The plastic glazing of Example 1, wherein the one or more aerodynamic features comprises a rear wing.

Example 12

The plastic glazing of any of Examples 1-11, wherein the first translucent component comprises the one or more aerodynamic features.

Example 13

The plastic glazing of any of Examples 1-11, wherein the first translucent component comprises a first section of an aerodynamic feature and the second translucent component comprises a second section of the aerodynamic feature.

Example 14

The plastic glazing of Example 13, wherein the first section of the aerodynamic feature and the second section of the aerodynamic feature are connected.

Example 15

The plastic glazing of Example 1, wherein the first translucent component comprises one or more functional openings.

Example 16

A plastic glazing of a tailgate of a vehicle, the plastic glazing comprising: a first translucent component comprising a full panel of the plastic glazing; a second translucent component molded onto the first translucent component, wherein the second translucent component is a colored thermoplastic polymer, wherein the plastic glazing is of one-piece molded plastic construction, wherein at least one of the first translucent component and the second translucent component comprises one or more functional openings.

Example 17

The plastic glazing of any of Examples 1 and 16, wherein each of the first translucent component and the second translucent component is a polycarbonate.

Example 18

The plastic glazing of any one of Example 15-17, wherein the one or more functional openings comprises a first opening configured to provide ventilation to an interior of the vehicle.

Example 19

The plastic glazing of any one of Example 15-18, wherein the one or more functional openings comprises a second opening configured to stabilize an interior pressure of the vehicle.

Example 20

The plastic glazing of any one of Example 15-19, wherein the one or more functional openings comprises a third opening configured to defog a surface of the vehicle.

Example 21

The plastic glazing of any one of Example 15-17, wherein the one or more functional openings comprises a first opening and a second opening, wherein the first opening and the second opening are different types of openings selected from a group comprising: a first type of opening configured to provide ventilation to an interior of the vehicle; a second type of opening configured to stabilize an interior pressure of the vehicle; and a third type of opening configured to defog a surface of the vehicle.

Example 22

The plastic glazing of any of Examples 1 and 16, wherein the plastic tailgate is produced using a multi-shot injection molding process.

Example 23

The plastic glazing of Example 22, wherein the second translucent component is molded onto the first translucent component in a second shot of the multi-shot injection molding process.

Example 24

The plastic glazing of any of Examples 22 and 23, further comprising a third translucent component molded onto the first translucent component, wherein the third translucent component comprises one or more different aerodynamic features.

In general, systems and methods disclosed herein may alternately comprise, consist of, or consist essentially of, any appropriate components herein disclosed. The invention may additionally, or alternatively, be designed so as to be devoid, or substantially free, of any components used in the prior art compositions or that are otherwise not necessary to the achievement of the function and/or objectives of the present invention.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Aspects of the present disclosure described in connection with illustrated embodiments have been presented by way of illustration, and the present disclosure is therefore not intended to be limited to the disclosed embodiments. Furthermore, the structure and features of each embodiment described herein can be applied to the other embodiments described herein. Accordingly, those skilled in the art will realize that the present disclosure is intended to encompass all modifications and alternative arrangements included within the spirit and scope of the present disclosure, as set forth by the appended claims.

What is claimed is:

1. A plastic glazing of a tailgate of a vehicle, the plastic glazing comprising:
    a first translucent component comprising a full panel of the plastic glazing; and
    a second translucent component molded onto the first translucent component, wherein the second translucent component is a colored thermoplastic polymer,
    wherein the plastic glazing is of one-piece molded plastic construction,
    wherein at least one of the first translucent component and the second translucent component comprises one or more aerodynamic features, and
    wherein the one or more aerodynamic features are each configured to reduce one or more of: a turbulence, a drag force, and a lift force.

2. The plastic glazing of claim 1, wherein the one or more aerodynamic features comprises a spoiler.

3. The plastic glazing of claim 1, wherein an overlapping portion of the first translucent component and the second translucent component forms a lens of a molded light assembly,
wherein the molded light assembly is formed in the spoiler.

4. The plastic glazing of claim 3, wherein the molded light assembly is a brake light.

5. The plastic glazing of claim 2, wherein the spoiler comprises:
a first section disposed horizontally along a top portion of the plastic glazing;
a second section disposed vertically along a first side portion of the plastic glazing; and
a third section disposed vertically along a second side portion of the plastic glazing,
wherein the first side portion and the second side portion are opposite to one another.

6. The plastic glazing of claim 5, wherein the first section, the second section, and the third section of the spoiler are connected to each other to form a continuous component.

7. The plastic glazing of claim 1, wherein the one or more aerodynamic features comprises a rear wing.

8. The plastic glazing of claim 1, wherein the first translucent component comprises one or more functional openings configured to provide an airflow path between an interior environment and an exterior environment of the vehicle.

9. The plastic glazing of claim 8, wherein the one or more functional openings comprises a first opening and a second opening, wherein the first opening and the second opening are different types of openings selected from a group comprising:
a first type of opening configured to provide ventilation to an interior of the vehicle;
a second type of opening configured to stabilize an interior pressure of the vehicle; and
a third type of opening configured to defog a surface of the vehicle.

10. A plastic glazing of a tailgate of a vehicle, the plastic glazing comprising:
a first translucent component comprising a full panel of the plastic glazing; and
a second translucent component molded onto the first translucent component, wherein the second translucent component is a colored thermoplastic polymer,
wherein the plastic glazing is of one-piece molded plastic construction, and
wherein at least one of the first translucent component and the second translucent component comprises one or more functional openings.

11. The plastic glazing of claim 10, further comprising one or more aerodynamic features.

12. The plastic glazing of claim 11, wherein the one or more aerodynamic features comprises a spoiler.

13. The plastic glazing of claim 12, wherein the spoiler comprises:
a first section disposed horizontally along a top portion of the plastic glazing;
a second section disposed vertically along a first side portion of the plastic glazing; and
a third section disposed vertically along a second side portion of the plastic glazing, wherein the first side portion and the second side portion are opposite to one another.

14. The plastic glazing of claim 10, wherein an overlapping portion of the first translucent component and the second translucent component forms a lens of a molded light assembly,
wherein the molded light assembly is formed in the spoiler.

15. The plastic glazing of claim 14, wherein the molded light assembly is a brake light.

* * * * *